US008452463B2

(12) United States Patent
Cox et al.

(10) Patent No.: US 8,452,463 B2
(45) Date of Patent: May 28, 2013

(54) ADJUSTING THE THERMAL BEHAVIOR OF A COMPUTING SYSTEM USING INDIRECT INFORMATION ABOUT AMBIENT TEMPERATURE (75) Inventors: Keith Cox, Campbell, CA (US); Gaurav Kapoor, Santa Clara, CA (US); Frank Faqiu Liang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 398 days.

(21) Appl. No.: 12/794,464

(22) Filed: Jun. 4, 2010

(65) Prior Publication Data
US 2011/0301777 A1 Dec. 8, 2011

(51) Int. Cl.
*G06F 19/00* (2011.01)
(52) U.S. Cl.
USPC .......................................... 700/299; 455/574
(58) Field of Classification Search
USPC .......... 700/299, 300; 455/574, 343.1; 706/12, 706/62; 713/600
See application file for complete search history.

(56) References Cited

U.S. PATENT DOCUMENTS

| | | | |
|---|---|---|---|
| 7,016,705 B2 * | 3/2006 | Bahl et al. ...................... | 455/566 |
| 7,520,669 B2 | 4/2009 | Yazawa et al. | |
| 7,606,566 B2 | 10/2009 | Ogoshi | |
| 2004/0264125 A1 * | 12/2004 | Cheng et al. ................... | 361/687 |
| 2005/0221791 A1 * | 10/2005 | Angelhag .................. | 455/343.5 |
| 2006/0019724 A1 * | 1/2006 | Bahl et al. ....................... | 455/574 |
| 2006/0059004 A1 * | 3/2006 | Ussery et al. ...................... | 705/1 |
| 2006/0135193 A1 * | 6/2006 | Ratasuk et al. ................ | 455/522 |
| 2006/0193113 A1 * | 8/2006 | Cohen et al. ................... | 361/687 |
| 2008/0059004 A1 * | 3/2008 | Katoh et al. ................... | 700/300 |
| 2009/0195497 A1 * | 8/2009 | Fitzgerald et al. ............ | 345/156 |
| 2010/0094582 A1 | 4/2010 | Cox et al. | |

FOREIGN PATENT DOCUMENTS

JP 2005250855 9/2005

OTHER PUBLICATIONS

Kyeong-Jae Lee, Micro-Architectural Temperature Modeling Usong Performance Counters, Mar. 29, 2005, School of Engineering and Applied Science University of Virginia, p. 1-49.*

* cited by examiner

*Primary Examiner* — Kidest Bahta
(74) *Attorney, Agent, or Firm* — Blakely, Sokoloff, Taylor & Zafman LLP (57) ABSTRACT

A computing system has a thermal manager that changes a power consuming activity limit in the device based on an estimate of temperature of a target location in the system. There are several temperature sensors that are not at the target location. An estimator computes the target location temperature estimate using a thermal model and, as input to the thermal model, data from the sensors. The thermal model produces different estimates of the target location temperature at different ambient temperatures but without computing or measuring the ambient temperatures. Other embodiments are also described and claimed.

16 Claims, 6 Drawing Sheets

ADJUSTING THE THERMAL BEHAVIOR OF A COMPUTING SYSTEM USING INDIRECT INFORMATION ABOUT AMBIENT TEMPERATURE

BACKGROUND

An embodiment of the invention relates to temperature or thermal modeling and thermal management in a handheld multi-function wireless communications device such as a smart phone. Other embodiments are also described.

Consumers' appetite for more performance and functionality from a small form factor, portable computing system such as a handheld wireless communications device (e.g., a smart phone) typically outpaces developments in low power consumption electronics. Thus, manufacturers of such devices are forced to find better ways of coping with high temperature effects (thermals) while trying to maintain a desired performance level for the user. Further, as more functionality and components are packed into a small form factor housing that has limited cooling capacity, the system exhibits "hotspots" or "critical points" inside and/or on the outside surface of the housing, where there is a potential to overheat under certain circumstances (e.g., while the user is playing a video game on his smart phone in hot weather for an extended period of time, a small portion of the rear face of the smart phone may become uncomfortably warm for the user who is holding the phone in his hand).

A closed loop thermal management or control subsystem is typically included in high performance, small form factor computing systems, to manage the thermal behavior of the system so as to avoid thermal issues at suspected critical points. The thermal management subsystem typically includes software (running in the background of the computing system) that gathers temperature data from various temperature sensors embedded in the system in addition to data regarding the current power consumption activity levels in the system. It then processes this data using stored algorithms (that have been determined at the factory) in order to make decisions on whether or not to change any one or more of several power consumption or activity levels in the system that are responsible for heating the system. For instance, the algorithm may indicate that, based on the current input data, one or more proactive measures need to be taken now, in order avoid a potential thermal issue at a given hotspot. The measures may include throttling of a particularly power-hungry component such as an applications processor (e.g., reducing a clock frequency; reducing power supply voltage), activating a cooling fan, and limiting the maximum output power of an audio or RF power amplifier or light source. The algorithm may also work to boost certain activity limits whenever warranted by the input data (e.g., all critical points are cool enough such that cooling fans can remain inactive and all power-hungry components can be allowed to run at their maximum performance level).

A computing system may have several critical points that are located in places where it is difficult to place temperature sensors (e.g., outside surface of a glass panel of a touch screen; outside surface of a back case of a smart phone). Typically, a number of temperature sensors are available, in locations such as on a central processing unit die, in a rotating disk drive unit, on a battery, and near an RF power amplifier. Mathematical thermal modeling techniques have been developed that can estimate the temperature of a target location in a computing system in essentially real-time, based on temperature data coming from integrated sensors in the system that are not at the target location. See for example US Patent Application Publication No. 2010/0094582 of Keith Cox, et al., "Method for Estimating Temperature at a Critical Point", assigned to the same assignee as the present application ("Our Earlier Application"). A thermal management subsystem relies on such temperature estimates to help it make the right decisions in order to maintain as high a performance limit as possible within various data processing components of the computing system while maintaining the temperature at one or more critical point within a specified set of constraints (e.g., not exceeding any specified critical point temperature limits).

At times it may be desirable to adjust the thermal behavior of a computing system based on the ambient temperature (air temperature outside the housing of the system) during normal or in-the-field use of the system by an end user. For instance, the thermal management system may be designed to actually allow the system to run a little hotter at a higher ambient. This type of adjustment may require knowledge of the ambient temperature. A temperature sensor may be placed at a "cold" spot of the system, to provide a sensed temperature value that is representative of the ambient. However, for a system that has a small form factor such as a smart phone for instance, it may be impossible to find a spot that is not affected by the heat generated inside the system. Another option is to model the ambient temperature (estimate it) based on data from the internal temperature sensors and power sensors, e.g. using the techniques described in Our Earlier Application.

SUMMARY

An embodiment of the invention is a method for adjusting the thermal behavior of a computing system during in-the-field use, using indirect information about ambient temperature and about constraints at a different ambient, that have been folded into a "perturbed" temperature model. The temperature model is stored in the memory of the system. The method still relies on temperature data received from one or more embedded temperature sensors in the system, and estimates (computes), using the perturbed temperature model, the temperature of a target location. In one embodiment, none of the sensors are at the target location, and none is at a cold spot of the system. A decision on whether or not to change a power consuming activity limit in the system is then made, based on the estimated temperature, e.g. as part of a closed loop thermal control process that aims to maintain the target location's temperature within a given constraint.

In one embodiment, a defining characteristic of the temperature model may be that, for the same power consumption state of the computing system, the model computes a different estimate at a lower ambient temperature than at a higher ambient temperature. For instance, if the overall or total power consumption of the system as well as that of individual components in the system are maintained essentially constant in order to present an essentially constant power consumption load, any then varying just the ambient temperature, the model will compute a lower temperature estimate at a higher ambient than at a lower ambient. This behavior of the model is for the situation where the specified constraint allows the target location to run hotter at the higher ambient. For a different constraint at the higher ambient, the model may be designed to behave differently. Note that the model can produce its estimates at different ambients, without requiring any measure or estimate of the ambient temperature as an input.

In addition, the thermal control process may respond to the estimated temperature, at the higher ambient, in the same way as it would at the lower ambient, i.e. the constraint to which the estimate is actually compared may remain unchanged.

Thus, the actual constraint at the higher ambient need not be explicitly available to the thermal control process. The ambient temperature is also not required as an input to the thermal control process.

The thermal control process may continue to manage thermal behavior as if it were doing so at the lower ambient. However, because the perturbed temperature model is under-predicting, the thermal control process will allow the computing system to run hotter than it would have if the temperature model were predicting the actual temperature (of the target location). Thus, instead of the thermal control process determining the current ambient temperature and then changing the constraints for the target location (during in-the-field use of the computing system), such information has been in essence folded into the temperature model at the time the model is generated, i.e. at the factory or laboratory.

In accordance with another embodiment of the invention, a personal mobile device has a thermal manager that changes a power consuming activity limit in the device based on an estimate of temperature at a target location in the device. An estimator computes the estimate using a thermal model and, as input to the thermal model, temperature data from several temperature sensors embedded in the device. None of these sensors is at the target location. The thermal model produces different estimates of the target location temperature at different ambient temperatures, but without computing or measuring the ambient temperatures. This may be achieved by incorporating information about ambient temperature into the thermal model, for example by adding an offset to the measured, target location temperature data during development of the device at the factory or during laboratory testing, and then computing the model using the offset temperature measurements (rather than the actual temperature measurements). The offset may represent a desired difference in the constraint, placed on the target location temperature, at different ambient temperatures.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
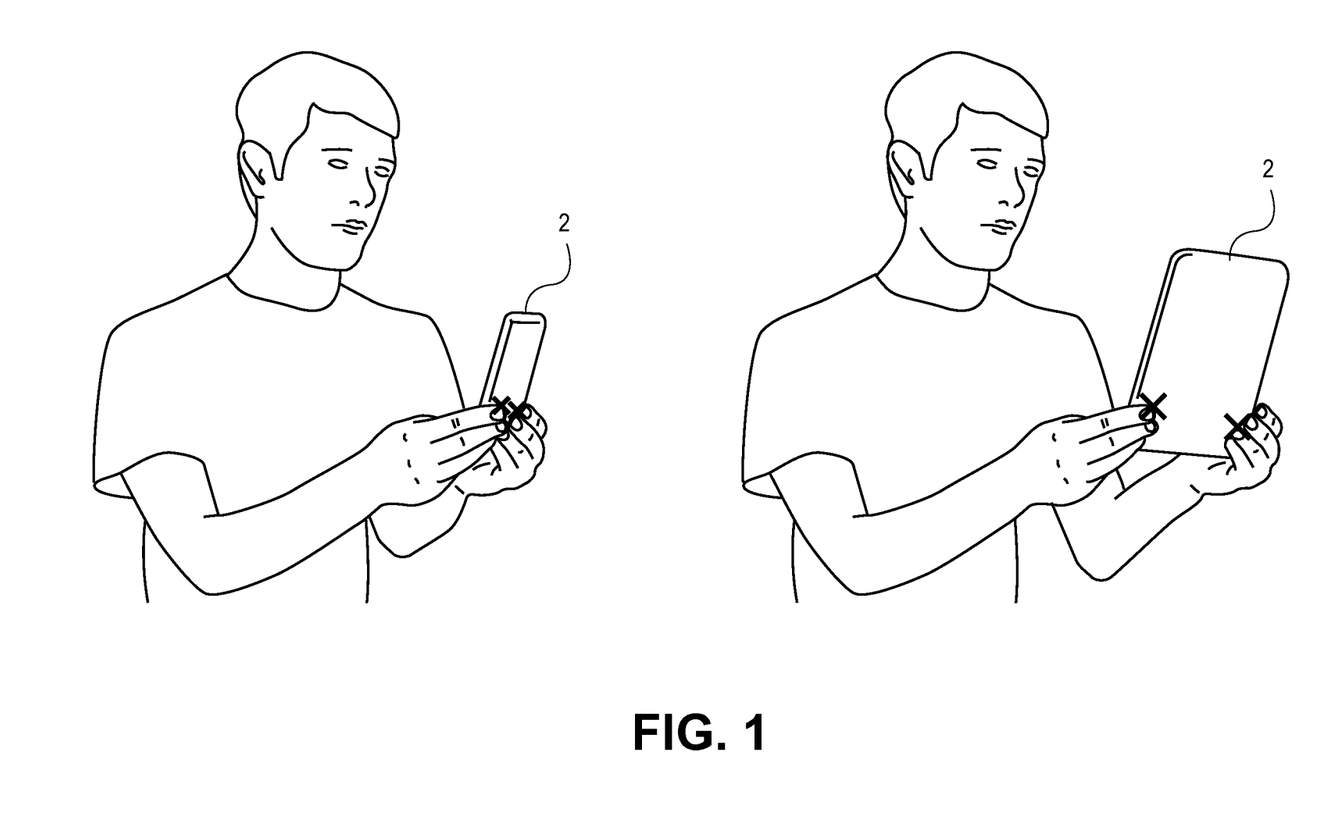
FIG. 1 shows a human user holding different types of a computing system, namely multi-function handheld mobile devices such as a smart phone and a handheld tablet-like personal computer.
Figure 6:
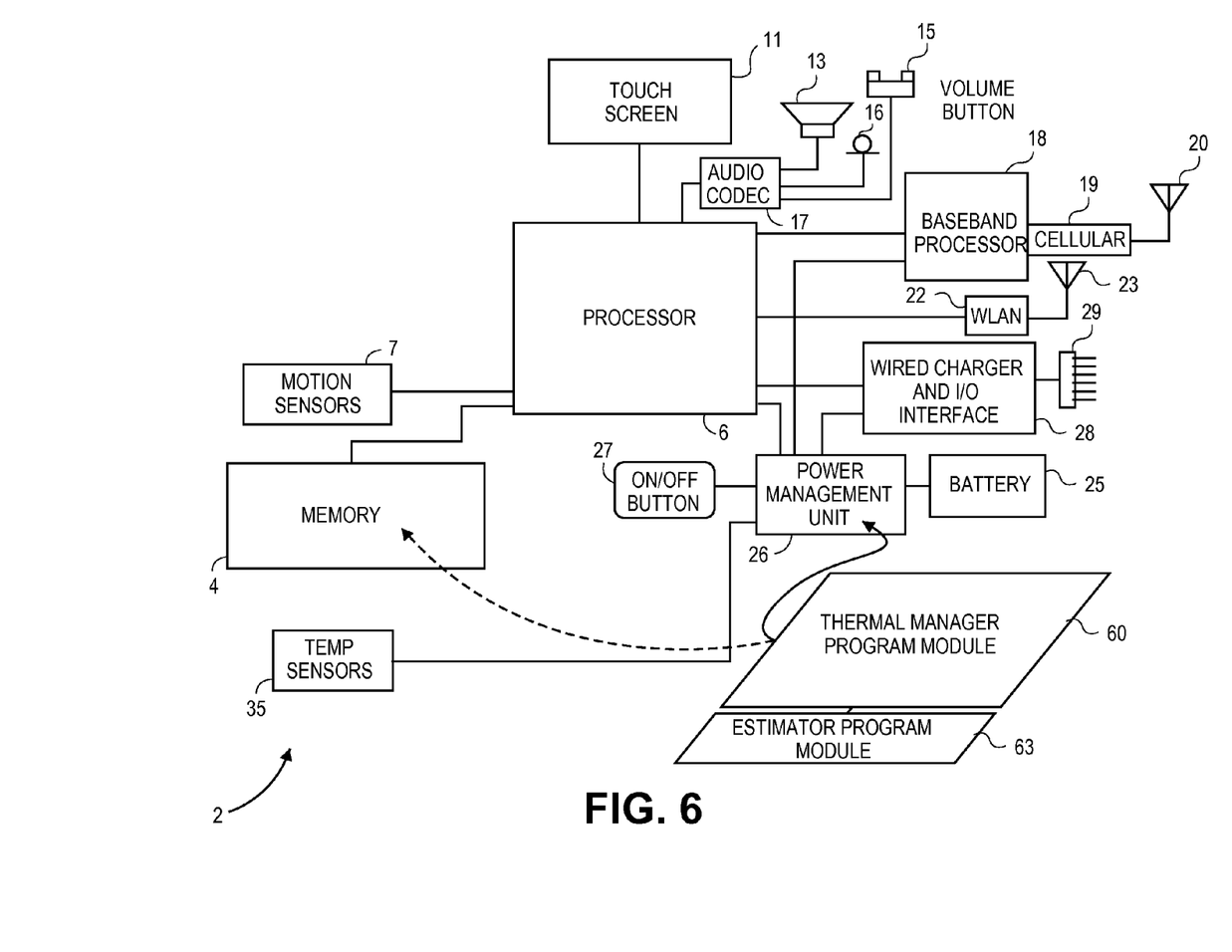
FIG. 6 is a block diagram of the functional unit blocks and hardware components in an example computing system.

FIG. 1 shows a human user holding different types of a computing system being in this example a multi-function handheld mobile device referred to here as a personal mobile device 2. In one instance, the mobile device 2 is a smart phone or a multi-function cellular phone with several features typically available in such modern devices, such as a touch screen interface, music and video file recording and playback, digital camera, video games, and wireless-enabled applications such as voiceover Internet protocol telephony, electronic calendar, web browser, and email. In another instance, the mobile device 2 may be a larger, handheld tablet-like computer such as an iPad™ device by Apple Inc. In another instance, the mobile device 2 may be a laptop or notebook computer. Such devices are often used at quite different ambient temperatures, for instance, inside a relatively cooler air conditioned room, and outside under a summer sun. FIG. 1 also shows example target locations on the outside surface of the housing of the device 2, which in this case are critical points (potential hotspots) located on the sides and on the back of the housing where the user is holding the device in his hands. Another possible target location is a region on a back face of the housing where the user typically holds the device 2 in a telephone handset configuration against her ear, during a call. A functional unit block diagram and some constituent hardware components of the device 2, for example, as found in an iPhone™ device by Apple Inc., is given in FIG. 6 and described at the end of this document.

Figure 2:
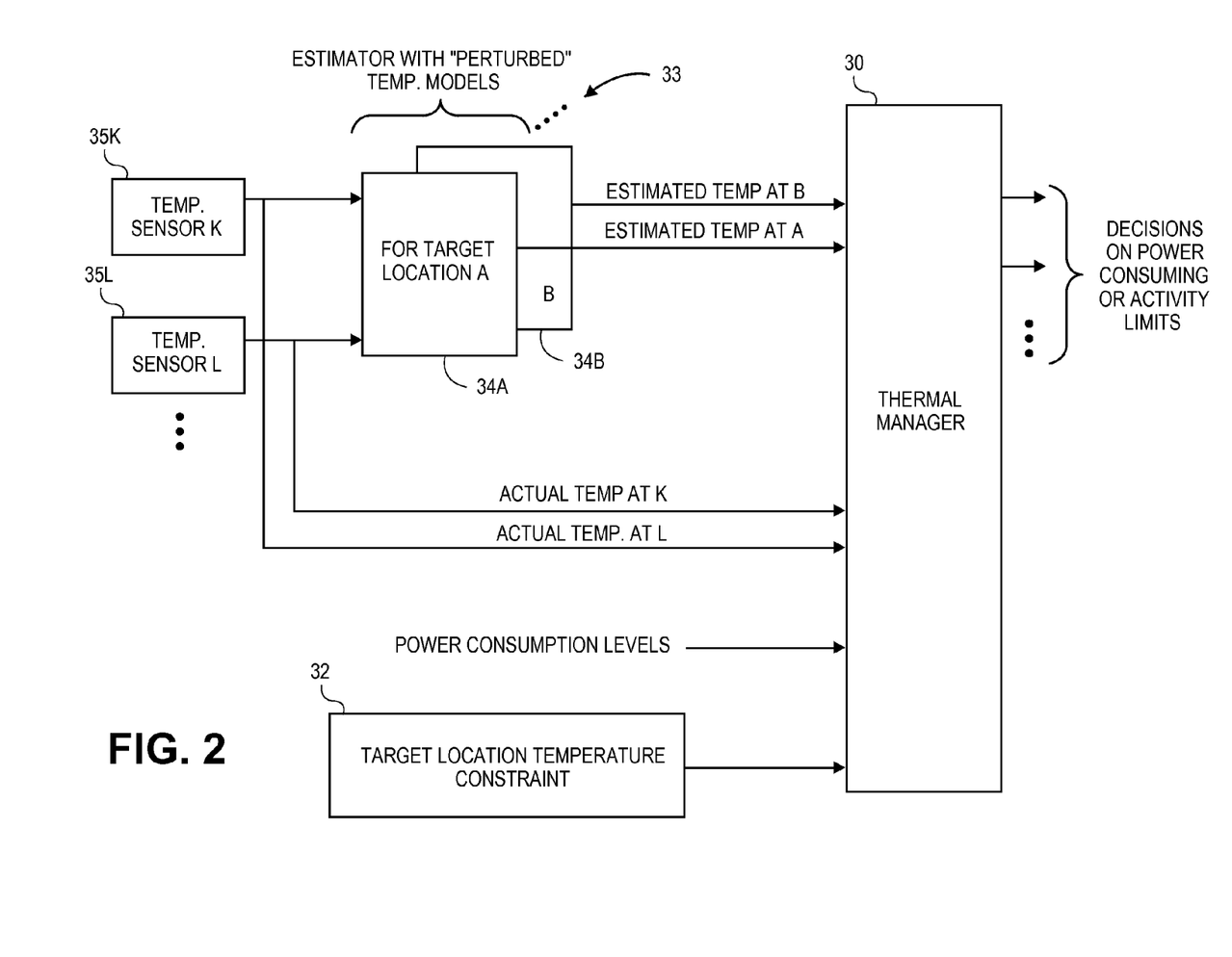
FIG. 2 is a block diagram of some of the elements that may be involved in performing a thermal management function of the computing system.

Turning now to FIG. 2, a block diagram of some of the elements that may be involved in performing a thermal control process or thermal management function of a computing system is shown. It should be noted that while a mobile device is used to explain the various embodiments of the invention here, the elements in FIG. 2 as well as the algorithms described later for thermal modeling and control can alternatively be implemented in other types of computing systems such as desktop computers, servers, networking devices such as routers and switches, as well as systems on a chip.

A thermal manager 30 makes decisions on whether or not to change one or more power consuming activity limits in the device 2, based on at least one estimated temperature for a target location in the device 2. The estimate is also referred to here as a virtual temperature because there is no actual sensor at the location. The thermal manager 30 controls the thermal behavior of the system by, for instance, increasing fan speed or reducing power consumption within one or more components of the system, as a given virtual temperature approaches its ambient-adjusted constraint.

To provide more sophisticated control of the thermal behavior, additional inputs may be provided to the thermal manager 30, including sensed temperature data obtained using one or more embedded temperature sensors 35, and at least one power consumption level of a particular component in the device 2. As an example, the thermal manager 30 may be receiving a sample every second, from a sensor 35 that is in a large microprocessor integrated circuit die of the device 2. In addition, there may be a sample sequence arriving from a sensor that is near a battery charging circuit. Also, measurements or estimates of the microprocessor's power consumption level may also be received during such sequences. All of this information may be input to an algorithm in the thermal manager 30 that makes the decisions on whether or not to change any particular power consuming activity limits, in order to maintain a specified constraint for the target location temperature.

The virtual temperatures of the target locations are computed by an estimator 33, using individual temperature models 34 for each target location. Note that the target location is one that does not have a temperature sensor that is sufficiently near to provide an accurate measure of its temperature. In other words, the temperature sensors 35 whose output temperature data are used by the models 34 are not located at the target location. Indeed, if any of these sensors are considered to be at the target location, then there would be no need for estimating the temperature for that location. A temperature sensor 35 may include a thermistor or other suitable component that can respond to changes in temperature, together with any signal conditioning and analog to digital conversion circuitry needed to provide a digital output (suitable for digital signal processing by the estimator 33).

The arrangement in FIG. 2 is capable of managing the thermal behavior of the device 2 during in-the-field use, that is, normal use by an end user of the device 2. The thermal manager 30, in particular, will adjust how the different parts of the device 2 heat up and/or cool down during normal use, in order to maintain the estimated temperature of the target locations within a set of predefined constraints 32. Note that the explicit constraints 32 stored in the device 2, for purposes of the thermal manager 30 and the temperature models 34 described here, need not change when the device 2 is operating at different ambient temperatures. This aspect is described further below.

The following example thermal control scenario at different ambient temperatures uses actual numerical values, to help explain various aspects of the invention; the invention of course is not limited to such values. A constraint X may be defined that specifies a maximum comfort range (for the temperature at the target locations marked with an "x" in FIG. 1), e.g. 45 C-50 C, when the ambient temperature is 25 C. Now as suggested above in the Background, it may be desirable to actually allow the target location to get warmer at a higher ambient. For example, at 35 C ambient, the new constraint might be X+Δx, e.g. 50 C-55 C. This information (namely the different ambient temperatures and the desired change in the constraints) is incorporated into the temperature model 34 at the factory or laboratory, so as to result in a "perturbed" model. The temperature model 34 is perturbed in the sense that while it is designed to predict actual temperature when the ambient is 25 C, it is also designed to over-predict or under-predict at a different ambient, e.g. under-predict at the higher ambient of 35 C. The model is able to do so by changing how it processes the information that is available to it in a sequence or pattern of temperature data received from the embedded sensors 35, where it may be assumed that these temperature data sequences reflect the different thermal response of the device 2 at different ambients.

In the example here, the model is perturbed so as to under predict at the higher ambient. As a result, the thermal control process will allow the target location to rise by the amount of the under prediction. For instance, the thermal control process continuously compares the constraint limit to the predicted value, until the constraint is about to be exceeded at which point it signals that certain power consumption activity limits must be changed to prevent the target location from getting any warmer (e.g., start a cooling fan, reduce power supply voltage to a processor, etc.).

In other words, the thermal behavior has been adjusted for the different ambient, in accordance with the ultimate constraint required for the higher ambient, without actually determining the ambient temperature. Note however that at the lower ambient, the model predicts the actual temperature of the target location (no under-prediction or over-prediction), such that the same constraint continues to be applied by the thermal control process.

The concept of folding the information about different ambients and constraints into a perturbed temperature model may be validated based on having recognized that the desired thermal behavior of a mobile device 2 does not drastically change at different ambients. For instance, if $B_{25C}$ is the desired thermal behavior of a computing system at an ambient of 25 and $B_{35C}$ is the desired thermal behavior of the system at an ambient of 35 C, than an accurate model of ambient temperature may be required only if there is no relationship between the two desired behaviors, $B_{25C}$ and $B_{35C}$. However, in practice, it is observed that these behaviors are significantly related, and perhaps it is possible to even define $B_{35C}$ in terms of $B_{25C}$.

Figure 3:
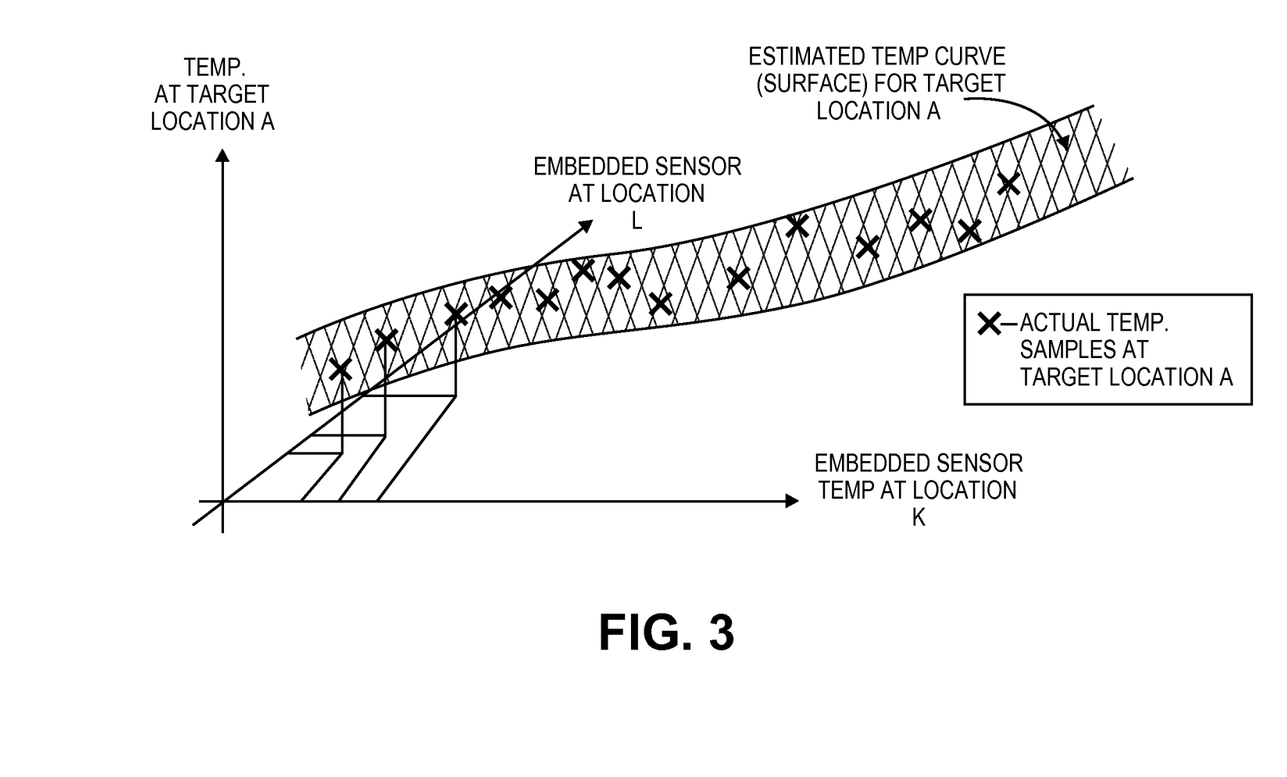
FIG. 3 shows a plot of some samples of the actual temperature at a target location versus temperature readings at other locations while a thermal load is being generated in the mobile device, together with a computed best-fit curve for estimating the target location temperature.
Figure 4:
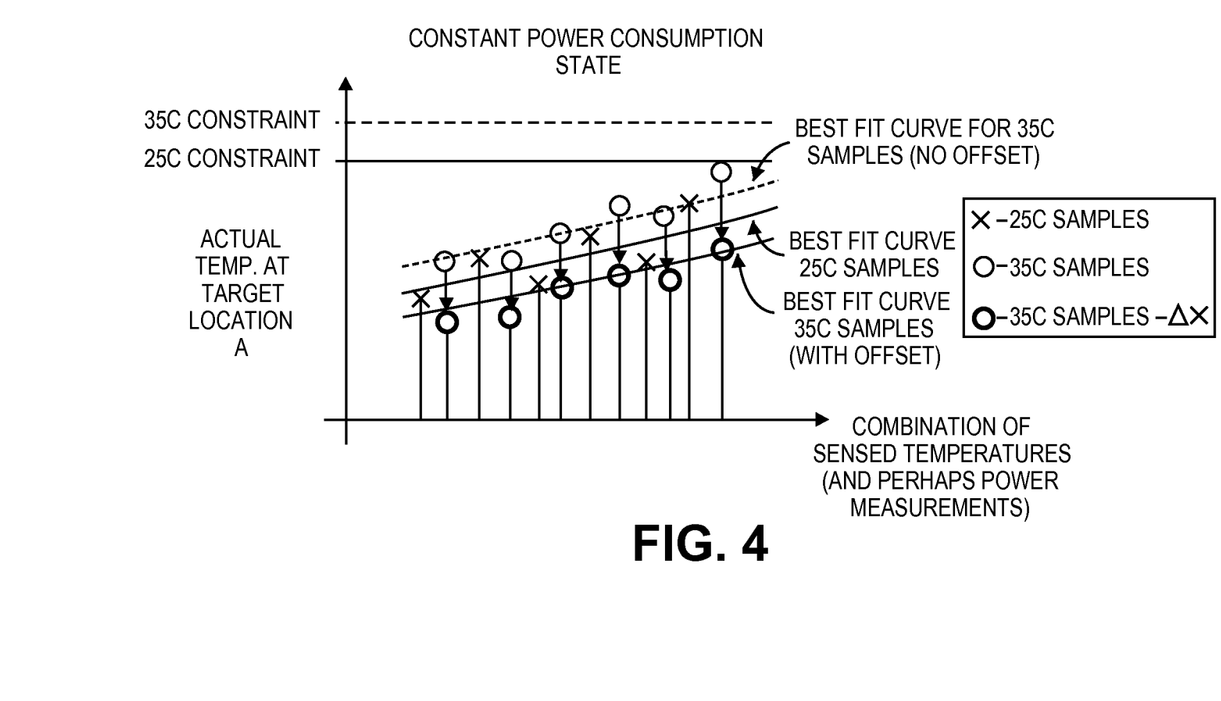
FIG. 4 is a plot of samples of actual temperature at a target location versus a combination of sensed temperatures, together with best-fit estimation curves for each ambient, and the ambient adjustment or offset applied to the samples.
Figure 5:
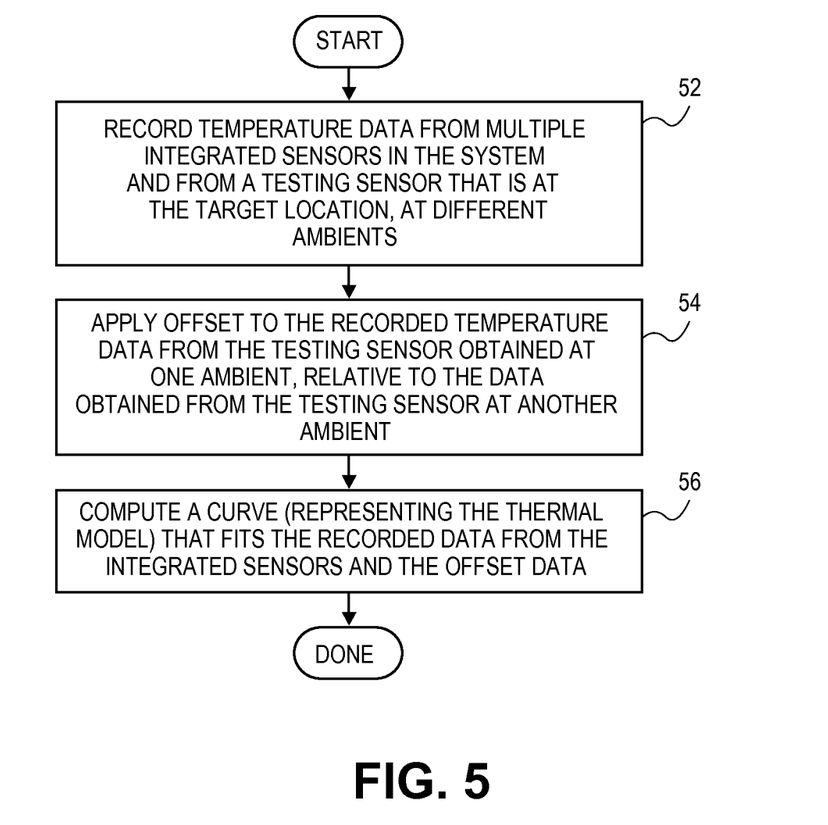
FIG. 5 is an algorithm or process flow diagram for computing a thermal model having inherent therein a constraint adjustment for different ambients.

To further explain how the temperature model 34 produces different estimates of the target location temperature at different ambient temperatures, but without computing or measuring the ambient temperatures, consider FIGS. 3-5. FIG. 3 shows a plot of some samples of the actual temperature at a target location versus temperature readings at other locations (while the components of the mobile device are being exercised, e.g. to simulate worst case in-the-field scenarios). The target location samples may be obtained using an external thermocouple that has been placed at that location. Although this figure shows two axes corresponding to two embedded sensors, this is done merely for ease of explanation. In general, there may be more than two embedded sensors in the device 2 (that may be used to compute a virtual temperature at a target location). The samples may alternatively be depicted in the time domain as a discrete-time sequence and then related to each other in a multidimensional plot as shown. Thus, the samples depicted in FIG. 3 may represent either transient or steady state behavior. Transient behavior is when the virtual temperature is changing as a function of time (due to rapid changes in power consumption of the device 2), while steady state is when the virtual temperature has stabilized or become essentially constant as a function of time (due to substantially unchanging or very slow changing activity).

Still referring to FIG. 3, the temperature model 34 may contain an estimated (computed) temperature curve or surface that is a best-fit curve for the measured, target location temperature samples. In other words, the estimated temperature curve is one that best predicts the actual temperature at the target location, using as input temperature data from one or more embedded sensors at other locations in the device. Our Earlier Application describes a particular technique for computing an unperturbed, temperature model that encompasses both transient and steady state thermal behavior of the target location (and includes at least one such best fit curve). This technique is only summarized here.

FIG. 4 is a plot of samples of actual temperature taken at the target location versus a combination of embedded sensor temperatures, together with best-fit estimation curves for different ambient temperatures. Once again, the example here is that of 25 C and 35 C ambients. The 25 C samples describe the thermal behavior of the system at that ambient, whereas the 35 C samples describe the thermal behavior of the system at the higher ambient. To predict the target location temperature, a best-fit curve for each set of ambient data may be computed. FIG. 4 also depicts the different constraints at the different ambients. Note that the constraint for 25 C is a solid line whereas the limit for 35 C is a dotted line; that is because the constraint for 35 C need not be explicitly stored by the thermal management subsystem because it has been incorporated or folded into the temperature model.

The constraint at 35 C may be folded into the temperature model as follows. In one embodiment, an offset or adjustment $\Delta x$ is defined based on, for example, the difference between the constraint at 25 C ambient and the constraint at 35 C ambient. For example, this difference may be about 5 C. The offset may be set equal to this difference. This results in the 35 C samples shown in the plot of FIG. 4 dropping down by 5 C; a best-fit curve may be computed for these offset samples and this curve may then become part of the perturbed temperature model.

Turning now to FIG. 5, a process flow diagram or algorithm for computing the perturbed thermal model 34 is shown. The process may be performed during manufacturing or laboratory testing, prior to releasing the thermal manager 30 and estimator 33 as part of a new specimen of the mobile device 2, or as a firmware upgrade for previously sold specimens of the device 2. As mentioned above, the temperature constraints for the target locations are ambient dependent. For instance, the thermal control system can allow the temperature at the target location to rise to X degrees at 25 C, and then on to X+$\Delta x$ degrees at 35 C. However, instead of changing the constraint as a function of having detected the different ambients, the temperature model of the target location is perturbed such that it predicts accurately at 25 C, but under-predicts by $\Delta x$ degrees at 35 C. With such a perturbed temperature model, the thermal control system may continue to control the thermal behavior by comparing the virtual temperature with the constraint for 25 C, even at the higher ambient at 35 C. However, since at 35 C the perturbed temperature model under-predicts by $\Delta x$, the thermal control subsystem will allow the temperature at the target location to rise to X+$\Delta x$ degrees at 35 C. This, of course, provides in effect ambient dependent control of thermal behavior but without ever actually computing or measuring the ambient temperature.

Referring now to the process in FIG. 5, operation begins with block 52 in which temperature data from multiple, integrated or embedded sensors in the system is recorded, at the same time as data from a testing or external sensor (e.g., a thermal couple) that is placed at the target location is also recorded. This recording of temperature data is performed while various power consumption states in the device 2 are exercised. This data collection is repeated at one or more, different ambients. For instance, the specimen under test is placed in a temperature controlled environment at a first ambient, and is exercised in accordance with a predetermined power consumption or activity pattern (e.g., performing a wireless call for several minutes, and then once the call is finished pausing for a minute and then launching an email application and then closing the email application, and then on to a relatively long video game session, and so on). The same power consumption and activity pattern should be repeated at a second ambient while similar data recording is taking place.

Next, operation continues in block 54 by generating intentional inaccuracy at the higher ambient, i.e.

$$\text{DesiredTemp=actual temp. at ambient 25 C} \qquad (1)$$

$$\text{DesiredTemp=actual temp.}-\Delta x \text{ at ambient 35 C} \qquad (2)$$

Another way to view the above relationship is to apply the offset $\Delta x$ to the recorded temperature data (from the testing sensor) that is obtained at one ambient, relative to the data obtained from the testing sensor at another ambient (see FIG. 4). Operation may then proceed with block 56 in which the temperature model is computed for the DesiredTemp, as defined in the equations above. This may be viewed in another way as computing best-fit curves for (1) 35 C ambient recorded data from the testing sensor that has been offset, and (2) 25 C ambient recorded data from the testing sensor that has not been offset, in view of the respective ambient recorded data from the integrated sensors.

With respect to computing the best-fit curve or the temperature model in operation 56, an approach that is essentially identical to that described in Our Earlier Application can be taken. That approach is now summarized here, although it should be noted that other ways of computing the temperature model are possible.

First, it is recognized that the recorded temperature data (operation 52) needs to be segregated into a steady state portion and a transient portion. In other words, the steady state response at the target location is modeled separately than the transient response, and then the two models are merged to generate a final thermal model—the final model can estimate an instantaneous temperature at the target location, based on having processed several sensor temperature data sequences.

Regression analysis may be used for modeling temperature data in this case, where the dependent variable in the regression equation is modeled as a function of several independent variables. However, the regression analysis should only be used for the steady state portion of the response, because the steady state temperature of the target location does not vary much as a function of time. A multivariate linear regression equation for DesiredTemp can be generated, viz.

$$\text{predictedDesiredTemp}=\beta_0+\beta_1*\text{sensor1}+\beta_2*\text{sensor2}+ \qquad (3)$$

On the other hand, the transient portion of the response may be modeled using the technique described in Our Earlier Application referred to as the "three frequencies analysis" or filtering algorithm, to estimate a best-fit curve to the transient response data that has been collected. A mixture of exponentials may be used to generate the filter coefficients for each sensor, viz. step (4)

$$\text{Sensor1\_filter}=\alpha_1*\text{sensor1\_freq1}+\alpha_2*\text{sensor1\_freq2}+ \\ \alpha_3*\text{sensor1\_freq3}+\ldots$$

$$\text{Sensor2\_filter}=\alpha_1*\text{sensor2\_freq1}+\alpha_2*\text{sensor2\_freq2}+ \\ \alpha_3*\text{sensor2\_freq3}+\ldots$$

The two approximations are then combined to generate a complete thermal model of the temperature at the target location, where this model then allows the temperature to be estimated at any time instant (based on input temperature sequences from the various embedded sensors in real-time). The two predictors may be merged as follows.

$$\text{predictedDesiredTemp}=\beta_0+\beta_1*\text{sensor1\_filter}+ \\ \beta_2*\text{sensor2\_filter}+\beta_3*\text{sensor3\_filter}+ \qquad (5)$$

Steps (4), (5) and (6) are described in detail in Our Previous Application. Note that when computing the best-fit curve (either for the transient or the steady state portions), the recorded measured temperature data for the target location is offset by the adjustment amount. This will inherently yield a perturbed temperature model that has the characteristics described above, namely that it will underestimate the temperature for the target location at the higher ambient, by approximately the amount of the adjustment, $\Delta x$. The perturbed temperature model thus computed is then stored in a memory of each specimen of the device 2 that is then placed into in-the-field use by the end user.

It should also be noted that in addition to the perturbed temperature model, the thermal manager 30 that is also provided in the production specimen needs to be configured so that the constraints that it uses to perform closed loop thermal control are those that are associated with the lower ambient (for this example only). In other words, as the ambient changes, the constraints on the virtual temperature (target location) should not change, because the output of the temperature model inherently reflects the different constraint required for another ambient.

Relationship of Ambient Adjustment ($\Delta x$) with Model Inaccuracy

It has been observed that model inaccuracy may increase as the value of the ambient adjustment, $\Delta x$, increases. For example, although a perturbed model may be designed to under-predict by $\Delta x$ (at a higher ambient), the actual under-prediction by the model is not exactly $\Delta x$. This inaccuracy becomes greater as $\Delta x$ is increased. If $\Delta x$ is large enough, then it may be effectively equivalent to predicting the ambient temperature. The model inaccuracy, in that case, will depend on how much ambient information can be extracted from the internal sensors.

Determining a Desired Value for the Ambient Adjustment ($\Delta x$)

For most cases the desired value of ambient adjustment $\Delta x$ is based on an engineering specification from a developer of the personal mobile device 2 (which specifies the different constraints on a given virtual temperature, at different ambients). However, one can also determine the value of $\Delta x$ based on model inaccuracy, since the model inaccuracy increases for larger $\Delta x$. Another heuristic is to monitor the change in regression coefficients (as described in step (3) above), as $\Delta x$ is increased. An example algorithm for finding a suitable $\Delta x$ is as follows.
1. Start with $\Delta x=0$ and compute the values of the regression coefficients $\beta_i$ in step (3);
2. Increase $\Delta x$ by some amount, and compute the new values of the regression coefficients $\beta_i$, as well as the new model inaccuracy on validation data.
3. Find the change in the regression coefficients ($\Delta\beta_i$) and the change in model inaccuracy ($\Delta$Inaccuracy) on validation data.
4. Repeat steps 2 and 3 until some function $f(\Delta\beta_i, \Delta\text{Inaccuracy})>\epsilon$.

Detailed Block Diagram of an Example Computing System

FIG. 2 shows a functional unit block diagram and some constituent hardware components of a personal mobile device 2, e.g. as found in an iPhone™ device by Apple Inc. Although not shown, the device 2 has a housing in which the primary mechanism for visual and tactile interaction with its user is a touch sensitive display screen (referred to here as a touch screen) 11. The housing may be essentially a solid volume referred to as a candy bar or chocolate bar types as in the iPhone device. An alternative is one that has a moveable, multi-piece housing, such as a clamshell design, or one with a sliding, physical keypad as used by other cellular and mobile handset or smart phone manufacturers. The touch screen 11 is used to display typical features of visual voice-mail, web browser, email, and digital camera viewfinder, as well as others, and to receive input from the user via virtual buttons and touch commands.

For wireless telephony, which enables the user to receive and place audio and/or video calls, downlink audio during a call can be emitted from a speaker 13 (which may be an earpiece speaker or receiver, or it may be a headset earphone). Uplink audio includes the user's speech, which is picked up by a microphone 16 (e.g., mouthpiece microphone or headset microphone). Conversion between analog domain and digital domain for the speaker and microphone signals, in addition to digital audio signal processing for different applications running in the device 2, may be performed within audio codec 17. A physical volume switch or button 15 may also be connected to the codec. The codec 17 may be configured to operate in different modes, e.g. to service a digital media player function (such as an MP3 player that is playing back a music file that is stored in the device 2), as well as a wireless telephony function.

For wireless telephony, a baseband processor 18 is included to perform speech coding and decoding functions upon the uplink and downlink signals, respectively, in accordance with the specifications of a given protocol, e.g. cellular GSM, cellular CDMA, wireless VOIP. A cellular transceiver 19 receives the coded uplink signal from the baseband processor and up converts it to a carrier band before driving an antenna 20 with it; it receives a downlink signal from the antenna 20 and down converts the signal to baseband before passing it to the baseband processor 18. A wireless local area network transceiver 22 receives and transmits data packets from a nearby wireless router or access point, using an antenna 23.

Power is provided to operate the components shown in FIG. 2 by a battery 25 (generically used here to refer to a rechargeable power source that may also include a rechargeable fuel cell). The battery 25 is charged or replenished by an external power source such as a wall plug or automobile battery dc power adapter (not shown) that connects to a multi-pin docking connector 29 that is also integrated in the housing of the device 2. The connector 29 and its associated charger and I/O interface circuitry 28 may be in accordance with any suitable computer peripheral specification such as Universal Serial Bus (USB). The USB protocol allows for the connector 29 and its associated interface 28 to be used for both power transfer to recharge the battery 25 and for data I/O communications. The latter includes docking functions, to synchronize user content in the device 2 with another computer device owned by the user that may have substantially more data storage capacity, e.g. a desktop computer, a laptop/notebook computer.

The user-level functions of the device 2 are implemented under control of a processor 6 that has been programmed in accordance with instructions (code and data) stored in memory 4. The processor 6 and memory 4 are generically used here to refer any suitable combination of programmable data processing components and data storage that conduct the operations needed to implement the various functions of the device. The processor 6 may be an applications processor typically found in a smart phone, while the memory 4 may refer to microelectronic, non-volatile random access memory. An operating system may be stored in the memory 4, along with application programs specific to the various functions of the device, which are to be run or executed by the processor 6 to perform the various functions of the device 2. For instance, there may be a telephony application that (when launched, unsuspended, or brought to foreground) enables the user to "dial" a telephone number to initiate a telephone call using wireless VOIP or a cellular protocol and to "hang up" on the call when finished.

The device 2 presents a particularly challenging task for dissipating sufficient heat that is produced as a result of the various functions running inside its housing. As described above, a thermal management or thermal control process is needed to make sure that critical temperature points or hot spots inside an on the outside surface of the housing do not exceed their maximum constraints or specifications. For this purpose, a power management unit 26 may be included which is typically implemented as a programmed processor with associated analog and digital conversion circuitry, analog signal conditioning circuitry, and a data communications interface such as I2C needed to control or communicate with other components of the device (for purposes of thermal management). The PMU 26 obtains temperature data (or temperature readings) from multiple sensors 35, as well as power data (which may be sensed or estimated power consumptions of certain power hungry components such as the processor 6). The PMU 26 then processes that data to make decisions that effect power consumption activity, in order to maintain a given critical point temperature within a predetermined constraint. A thermal manager program module 60 may be stored in memory of the power management unit 26, or alternatively in the main memory 4, which specially programs a processor of the PMU 26 (or the processor 6) to perform the functions described above in connection with the thermal manager 30 in FIG. 2. Similarly, an estimator program module 63 may also be stored in memory, where that module programs a processor to perform the functions described above for the estimator 33, namely computing the estimated temperature at one or more selected target locations at which there are no temperature sensors available.

As explained above, an embodiment of the invention may be a machine-readable medium (such as microelectronic memory) having stored thereon instructions (code and data), which program one or more data processing components (generically referred to here as a "processor") to perform the digital temperature estimation and closed loop thermal control processing operations described above, including the time-domain processing of sensed temperature data sequences. In other embodiments, some of these operations might be performed by specific hardware components that contain hardwired logic (e.g., dedicated digital filter blocks for processing an input, sensed temperature data sequence). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the offset Δx depicted in FIG. 4 may appear to be a constant amount, it may alternatively be variable, e.g. smaller at the lower end of the X-axis and then progressively larger towards the higher end of the X-axis. Also, the offset may be variable as between different ambient ranges, e.g. the offset for modeling at 25 C-35 C may be different than the offset introduced for modeling at 35 C-40 C. The description is thus to be regarded as illustrative instead of limiting.

What is claimed is:

1. A method for adjusting the thermal behavior of a computing system, comprising:
   accessing a thermal model algorithm that is stored in memory of a computing system, wherein the thermal model algorithm estimates temperature of a target location in the system based on temperature data from a plurality of temperature sensors that are not at the target location, wherein for the same power consumption state of the computing system, the thermal model algorithm computes a different estimate at a higher ambient temperature than at a lower ambient temperature without estimating or measuring ambient temperature;
   receiving temperature data from the temperature sensors;
   estimating the temperature of the target location using the thermal model algorithm; and
   making a decision on whether or not to change a power consuming activity limit in the computing system, based on the estimated temperature.

2. The method of claim 1 further comprising receiving power consumption data for a component in the system, wherein the decision on the power consuming activity limit is made further based on the power consumption data.

3. The method of claim 1 wherein the temperature estimate at 25 C ambient is higher than at 35 C ambient, while power consumption state of the computing system remains constant.

4. The method of claim 1 wherein by estimating a lower target location temperature at the higher ambient temperature, the decision made on that basis allows the system to run hotter at the higher ambient temperature.

5. The method of claim 1 wherein the target location is an outside surface of the system that is touched by a user of the system.

6. An article of manufacture comprising:
   a machine-readable storage medium having stored therein instructions that program a processor in a mobile device to perform thermal control in the device at different ambient temperatures, the programmed processor is to receive temperature data output by a plurality of temperature sensors in the system, compute temperature of a target location in the device that is spaced apart from the plurality of sensors, using a thermal model and the temperature data as input to the thermal model, and make a decision on whether or not to change a power consuming activity limit in the device based on the computed temperature, wherein the power consuming activity limit is changed differently at different ambient temperatures based on the computed temperature but without estimating or measuring ambient temperature.

7. The article of manufacture of claim 6 wherein the power consuming activity limit is selected from the group consisting of:
   the speed of a cooling fan including whether the fan is on or off;
   a power supply voltage of a data processing unit;
   maximum transmit power of an RF antenna;
   clock speed of a data processing unit;
   whether a data processing unit is enabled or disabled; and
   intensity of a light source including whether the light source is on or off.

8. The article of manufacture of claim 6 wherein the thermal model is such that when it is used to predict temperature of a target location while the mobile device is at a lower ambient, and again while the mobile device is at a higher ambient, in both cases while power consumption state of the mobile device remains constant, the predicted temperature is about equal to the actual temperature of the target location at the lower ambient, but is less than the actual temperature at the higher ambient.

9. The article of manufacture of claim 6 wherein the decision on whether or not to change a power consuming activity limit in the device is further based on received power consumption data for a component in the device.

10. The article of manufacture of claim 6 wherein by computing a lower target location temperature estimate at the higher ambient temperature, the decision on the power consuming activity limit causes the device to run hotter at the higher ambient temperature.

11. The article of manufacture of claim 6 wherein the target location is an outside surface of the system that is touched by a user of the system.

12. A mobile device comprising:
   a thermal manager to change a power consuming activity limit in the mobile device based on an estimate of temperature of a target location in the device;
   a plurality of temperature sensors not at the target location; and
   an estimator to compute the estimate using a thermal model and, as input to the thermal model, temperature data from the sensors, wherein the thermal model produces different estimates of the target location temperature at different ambient temperatures but without computing or measuring the ambient temperatures.

13. The mobile device of claim 12 wherein the target location includes a critical point on an outside surface of the device that a user of the system touches while using the system.

14. The mobile device of claim 13 wherein the target location is a point on a back face or side of an external housing of the device that the user touches while using the device as a telephony handset.

15. A method for computing a thermal model, wherein the thermal model estimates temperature of a target location in a computing system during in-the-field use of the system based on temperature data from a plurality of temperature sensors that are not at the target location, the method comprising:
   recording temperature data from (a) a plurality of temperature sensors that are embedded in the computing system and (b) a testing temperature sensor that is temporarily placed at the target location in the computing system, wherein the data is collected while the system is operated at different ambient temperatures so that transient and steady state thermal behavior of the system at the different ambient temperatures is recorded;
   applying an offset to the recorded temperature data, or to a variable representing the recorded temperature data, that is obtained from the testing sensor at one ambient, relative to the recorded temperature data that is obtained from the testing sensor at another ambient; and
   fitting a curve or curved surface, that will be part of the thermal model, to the offset temperature data from the testing sensor, in relation to the recorded temperature data from the embedded sensors.

16. The method of claim 15 further comprising:
   determining the offset by
   a) beginning with a value of zero for the offset, computing an instance of the thermal model using the zero as the offset, wherein the thermal model includes a plurality of coefficients that have been computed so as to fit a curve to the recorded temperature data from the testing sensor and the embedded sensors, and computing a temperature for the target location using the instance of the thermal model in which the offset is zero,
   b) increasing the offset and then using it to compute a new instance of the thermal model, computing the change in the coefficients of the new instance of the thermal model relative to a previous instance of the thermal model, and the change in the inaccuracy of the new instance of the thermal model in predicting the temperature for the target location relative to the previous instance, and
   c repeating b) until a combination of the coefficient change and the inaccuracy change has become greater than a set threshold.

* * * * *